(12) United States Patent
Fisher

(10) Patent No.: US 6,620,872 B2
(45) Date of Patent: Sep. 16, 2003

(54) INFRARED (IR) ABSORBING POLYVINYL BUTYRAL COMPOSITION, SHEET THEREOF AND LAMINATE CONTAINING THE SAME

(75) Inventor: W. Keith Fisher, Suffield, CT (US)

(73) Assignee: Solutia, Inc., St. Louis, MO (US)

( * ) Notice: Subject to any disclaimer, the term of this patent is extended or adjusted under 35 U.S.C. 154(b) by 0 days.

(21) Appl. No.: 09/993,123

(22) Filed: Nov. 14, 2001

(65) Prior Publication Data

US 2002/0086926 A1 Jul. 4, 2002

Related U.S. Application Data

(60) Provisional application No. 60/249,449, filed on Nov. 20, 2000, and provisional application No. 60/248,324, filed on Nov. 14, 2000.

(51) Int. Cl.⁷ .................................................. C08K 3/10
(52) U.S. Cl. ........................ 524/403; 428/328; 428/407; 428/427; 428/432; 428/437; 524/404; 524/409; 524/413
(58) Field of Search ................................ 524/403, 404, 524/409, 413; 428/407, 427, 432, 437, 328

(56) References Cited

U.S. PATENT DOCUMENTS

| | | | | |
|---|---|---|---|---|
| 4,225,468 A | * | 9/1980 | Donohue et al. | 252/509 |
| 5,079,193 A | * | 1/1992 | Donohue | 501/15 |
| 5,280,005 A | * | 1/1994 | Nakajima et al. | 503/227 |
| 5,695,386 A | * | 12/1997 | Ryoke et al. | 451/41 |
| 5,830,568 A | * | 11/1998 | Kondo | 428/328 |
| 6,315,848 B1 | * | 11/2001 | Kondo | 156/99 |
| 6,319,613 B1 | * | 11/2001 | Takeda et al. | 428/12 |
| 6,329,061 B2 | * | 12/2001 | Kondo | 428/432 |

* cited by examiner

*Primary Examiner*—Judy M. Reddick
(74) *Attorney, Agent, or Firm*—Fitzpatrick, Cella, Harper & Scinto

(57) ABSTRACT

A polyvinyl butyral composition is disclosed which is comprised of polyvinyl butyral resin containing an IR absorbing effective amount of lanthanum hexaboride or a mixture of lanthanum hexaboride and at least one of tin oxide and antimony tin oxide. Also disclosed are a sheet of the IR absorbing polyvinyl butyral and a glass laminate having the IR absorbing polyvinyl butyral sheet disposed between two sheets of glass.

15 Claims, 2 Drawing Sheets

INFRARED (IR) ABSORBING POLYVINYL BUTYRAL COMPOSITION, SHEET THEREOF AND LAMINATE CONTAINING THE SAME

This application claims the benefit of U.S. Provisional Application No. 60/249,449, filed Nov. 20, 2000 and U.S. Provisional Application No. 60/248,324, filed Nov. 14, 2000.

BACKGROUND OF THE INVENTION

1. Field of the Invention

The present invention relates to an infrared (IR) absorbing polyvinyl butyral composition, a sheet made therefrom and glass laminates containing the sheet as an interlayer. In particular, the polyvinyl butyral composition contains at least lanthanum hexaboride (LaB6) and more preferably both lanthanum hexaboride and at least one of indium tin oxide (ITO) and antimony tin oxide (ATO).

2. Related Background Art

Polyvinyl butyral (PVB) resin sheet is used in light-transmitting laminates containing one or more rigid layers, such as glass, for applications such as automotive and architectural glazings, show cases, and protective glass for pictures, documents and the like. The PVB sheet absorbs energy and prevents disintegration when, for example, the head of a vehicle occupant strikes the rigid layer of a laminated window after a sudden stop or a foreign object is propelled against the outside of the laminate.

Glazings, including laminated glazings, tend to transmit heat energy. This can be particularly problematic in a confined area, such a vehicle passenger compartment or office, because of potential overheating of the confined area. Thus many techniques have been developed in an attempt to control heat transmission through glazings.

A conventional heat shielding transparent composite may comprise a very thin layer of reflective metal such as aluminum or silver which is deposited on a transparent substrate by vacuum deposition or sputtering techniques. This technique is limited on vehicle and building windows because the film thickness must be extremely thin. In addition, metallic layers may also suffer from corrosion problems.

It is known that nanoparticles of various inorganic oxides, can be dispersed within a resin binder to form coatings that reflect particular wavelength bands of infrared energy and allow high levels of transmission of visible light. In particular, U.S. Pat. No. 5,807,511 discloses that antimony doped tin oxide (ATO) has a very low transmission to infrared light having wavelength exceeding 1400 nm. U.S. Pat. No. 5,518,810 describes coatings containing tin doped indium oxide (ITO) particles that substantially block infrared light having wavelength above 1000 nm, and that the crystal structure of ITO can be modified to block light having wavelengths of down to 700–900 nm.

U.S. Pat. No. 5,830,568 describes a laminated glass with an interlayer film containing functional ultra-fine particles that provide heat insulation, ultraviolet ray absorption or maintenance of sufficient radio transmittance. The preferred interlayer film is polyvinyl butyral or ethylene-vinyl acetate copolymer. The exemplified ultra-fine particles include antimony tin oxide and indium tin oxide.

EP-A-1008564 discloses the use of an infrared blocking coating composition which contains both ATO or ITO, and metal hexaboride such as LaB6. The ATO or ITO blocks the higher wavelengths of infrared light and the metal hexaboride particles block the lower wavelengths of light. The coating may be applied to polymeric film substrates. There is no disclosure or suggestion, however, of employing metal hexaboride as a nanoparticulate dispersion in a PVB composition, particularly for use as an interlayer sheet in a glass laminate.

SUMMARY OF THE INVENTION

This invention is directed to a polyvinyl butyral composition comprising polyvinyl butyral resin containing an IR absorbing effective amount of lanthanum hexaboride. Preferably the polyvinyl butyral resin contains an IR absorbing effective amount of a mixture of lanthanum hexaboride and at least one of indium tin oxide and antimony tin oxide. The lanthanum hexaboride and any indium tin oxide and/or antimony tin oxide are present as fine particles, i.e., having a particle size that will not interfere with the visual transmission through a sheet comprised of such an IR absorbing polyvinyl butyral.

This invention is also directed to a sheet formed from the polyvinyl butyral composition of this invention as well as a glass laminate comprised of two sheets of glass having the sheet of this invention disposed therebetween. The sheet formed from the polyvinyl butyral composition of this invention may be used with heat absorbing glass to form a laminate with optimum solar absorbing properties. The glass laminate of this invention is particularly efficient at reducing IR transmission without degradation of the efficiency over time.

DETAILED DESCRIPTION OF THE INVENTION

Figure 1:
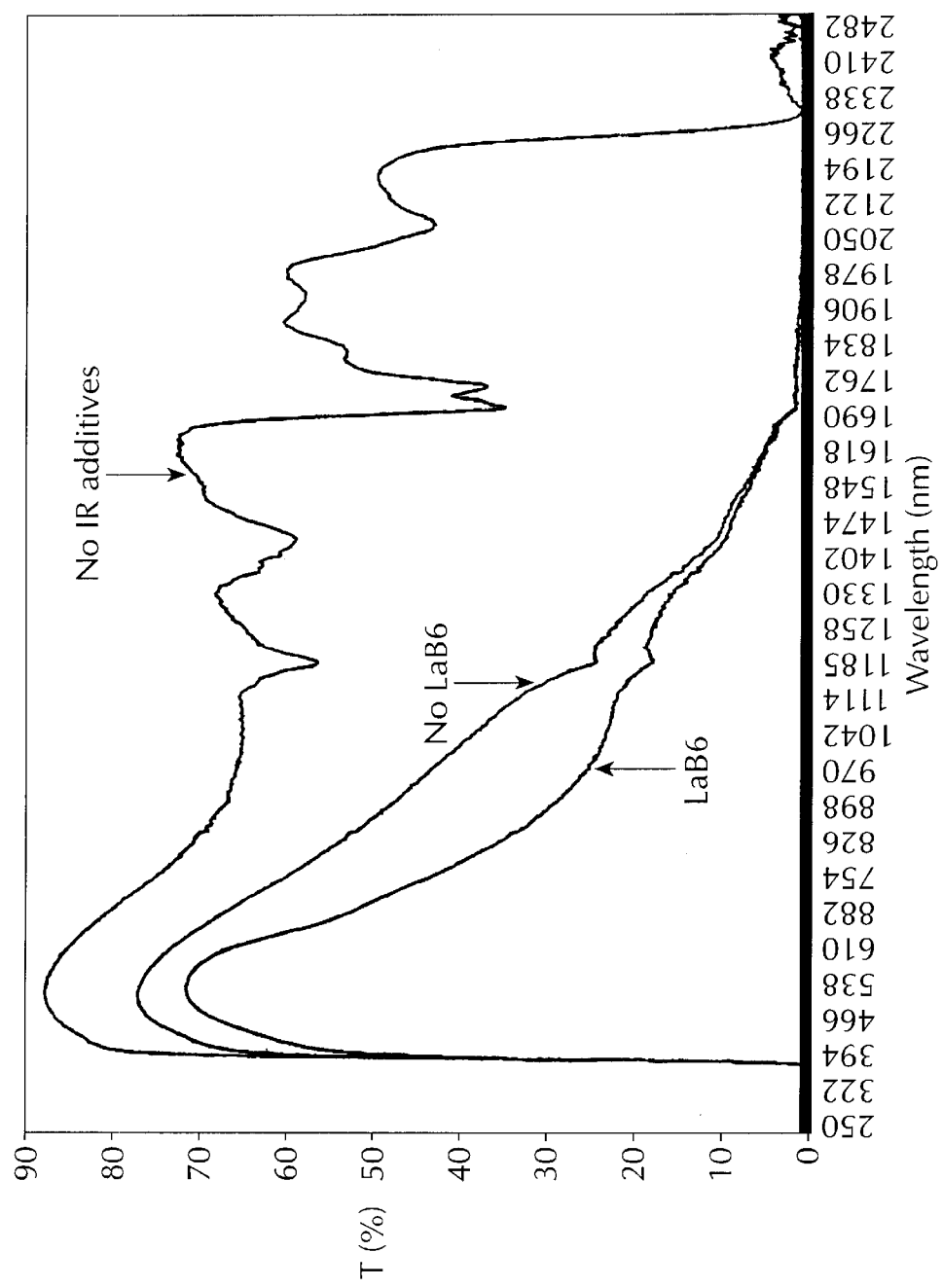
FIG. 1 is a transmission spectra indicating the effect of LaB6 on clear glass laminates having a polyvinyl butyral interlayer containing 0.45% antimony tin oxide. More specifically, the line labeled "LaB6" is the transmission spectrum of a glass laminate having a polyvinyl butyral interlayer containing 0.01% LaB6 and 0.45% antimony tin oxide; the line labeled "No LaB6" is the transmission spectrum of a glass laminate having a polyvinyl butyral interlayer containing 0.45% antimony tin oxide; and the line labeled "No IR additives" is the transmission spectrum of a laminate having a polyvinyl butyral interlayer containing no LaB6 and no antimony tin oxide.
Figure 2:
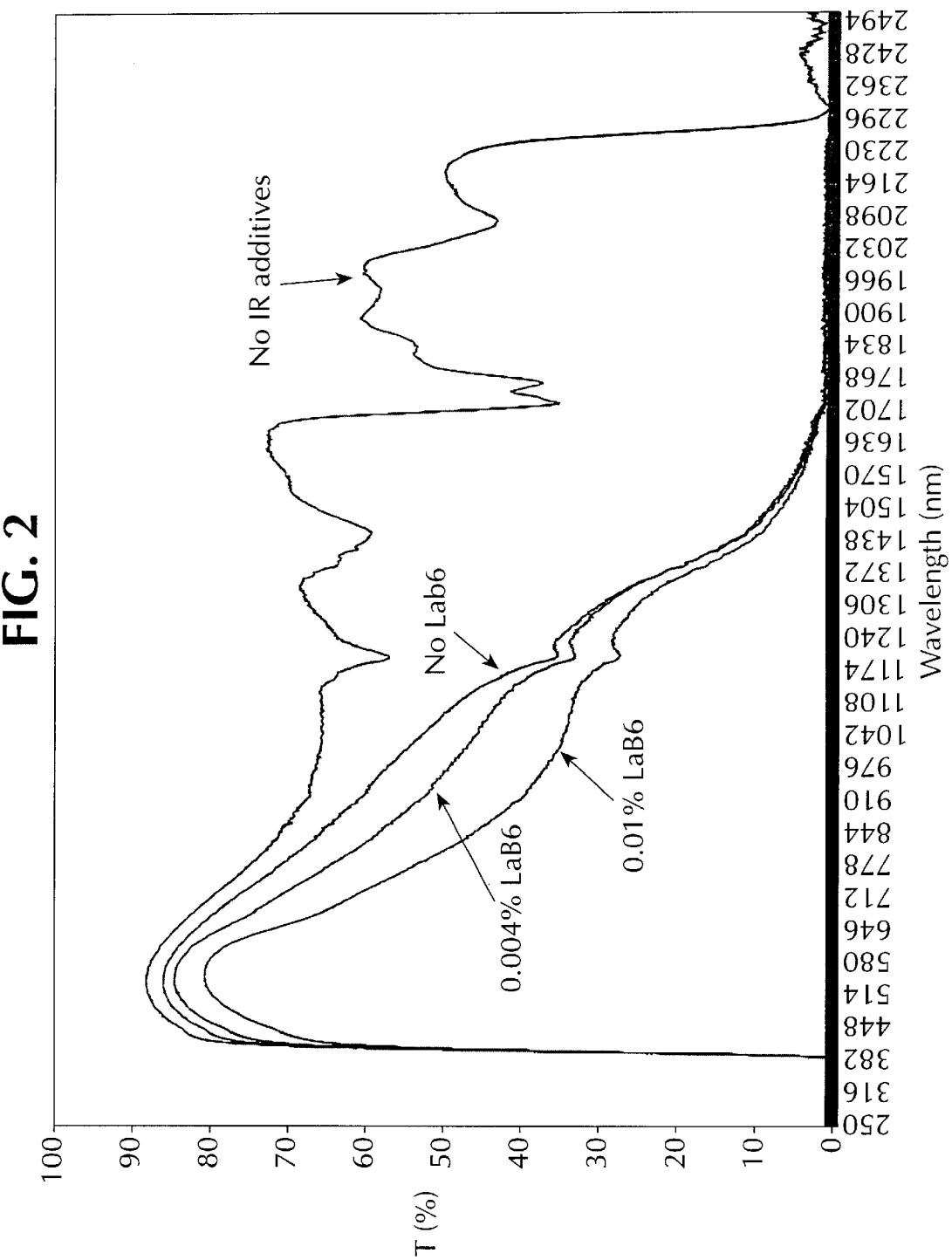
FIG. 2 is a transmission spectra indicating the effect of LaB6 on clear glass laminates having a polyvinyl butyral interlayer containing 0.2% indium tin oxide. More specifically, the lines labeled "0.01% LaB6" and "0.004% LaB6" are the transmission spectra of glass laminates having a polyvinyl butyral interlayer that respectively contain (i) 0.2% indium tin oxide and 0.01% LaB6 and (ii) 0.2% indium tin oxide and 0.004% LaB6; the line labeled "No LaB6" is the transmission spectrum of a glass laminate having a polyvinyl butyral interlayer containing 0.2% indium tin oxide; and the line labeled "No IR additives" is the transmission spectrum of a laminate having a polyvinyl butyral interlayer containing no LaB6 and no indium tin oxide.

The polyvinyl butyral resin of this invention will contain an IR absorbing effective amount of lanthanum hexaboride either alone or preferably in combination with at least one of indium tin oxide and doped tin oxide. If the lanthanum hexaboride is used alone as an IR absorbing agent then generally it will be present in the polyvinyl butyral resin in an amount of about 0.005% to about 0.1%, preferably about 0.01% to about 0.05%, and most preferably about 0.01% to about 0.04% percent by weight of the composition.

When lanthanum hexaboride is used in combination with at least one of indium tin oxide or antimony tin oxide as the IR absorbers, then the lanthanum hexaboride will typically be present in the polyvinyl butyral resin in an amount of about 0.001% to about 0.1%, preferably about 0.004% to about 0.05%, and most preferably about 0.006% to about 0.02% percent by weight of the composition.

In a preferred embodiment, indium tin oxide, antimony tin oxide or a mixture thereof will be present in the polyvinyl butyral composition in an amount of about 0.05% to about 2.0%, preferably about 0.1% to about 1.0%, and most preferably about 0.1% to about 0.5% percent by weight of the composition.

When a mixture of indium tin oxide and antimony tin oxide is used, the weight ratio of indium tin oxide to antimony tin oxide is generally about 90:10 to about 10:90, and preferably about 70:30 to about 30:70.

The polyvinyl butyral resin composition of this invention is used to make visually transparent sheets of PBV and visually transparent glass laminates containing such PVB sheet as an interlayer. Accordingly, the lanthanum hexaboride and any indium tin oxide and antimony tin oxide present must be fine particles which do not interfere with the visual transmission through the sheet. Such particles include nanoparticles which typically have a particle size less than 200 nm and most preferably in a range of 5 nm to 100 nm.

Each of the lanthanum hexaboride, indium tin oxide and antimony tin oxide is preferably introduced into the PVB resin by first forming a dispersion in a PVB compatible solvent, most preferably a plasticizer. It may also be possible to mix the IR absorbing particles into PVB by adding a solvent dispersion of those particles to the reaction mixture of PVOH and butyraldehyde prior to formation of the PVB.

While PVB is the preferred resin used in the present invention it should be recognized that other polymers which may be used to form interlayer sheets of glass laminates could be substituted for PVB. Generally, PVB resin has a weight average molecular weight greater than 70,000, preferably about 100,000 to 250,000, as measured by size exclusion chromatography using low angle laser light scattering. On a weight basis PVB typically comprises 15 to 25%, preferably about 16 to 19% hydroxyl groups calculated as polyvinyl alcohol (PVOH); 0 to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Solutia Incorporated, St. Louis, Mo. as Butvar® resin.

Preferably, the PVB resin used in the sheet of this invention is plasticized PVB. Plasticized PVB as sheet at a non-critical thickness of about 0.13 to 1.3 mm is formed by mixing resin and plasticizer and preferably (in commercial systems) extruding the mixed formulation through a sheet die, i.e., forcing molten, plasticized PVB through a horizontally long vertically narrow die opening substantially conforming in size to the sheet being formed, or by casting molten polymer issuing from an extrusion die onto a die roll in close proximity to the die exit to impart desired surface characteristics to one side of the polymer. When the roll surface has minute peaks and valleys, the side of the sheet contacting the roll will have a rough surface generally conforming to the valleys and peaks. Roughness on the other side can be provided by the design of the extrudate die opening as shown, for example, in FIG. 4 of U.S. Pat. No. 4,281,980. Other known techniques for producing a rough surface on one or both sides of an extruding sheet involve specifying and controlling one or more of the following: polymer molecular weight distribution, water content and temperature of the melt. These techniques are disclosed in U.S. Pat. Nos. 2,904,844; 2,909,810; 3,994,654; 4,575,540 and European Patent No. 0185,863. Embossing downstream of the extrusion die also roughens the sheet surface. As known, this roughness is temporary to facilitate deairing during laminating after which the elevated temperature and pressure during bonding of the sheet to glass melts it smooth. Lamination to glass is according to generally known procedures.

Sheets of the present invention may optionally contain additives (other than IR absorbers) to enhance performance such as dyes, pigments, ultraviolet light stabilizers, antioxidants, adhesion control agents and the like.

The PVB resin of the sheet is typically plasticized with about 20 to 80 and more commonly 25 to 60 parts plasticizer per hundred parts of resin. Plasticizers commonly employed are esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers.

The invention is also directed to a glass laminate comprising two sheets of glass with the inventive sheet disposed therebetween. Additional layers may also be disposed between the two sheets of the glass so long as the desired optical properties of the laminate are maintained. The glass sheets may be of any type of glass. Particularly preferred is the use of at least one sheet of glass that is heat absorbing glass, solar reflection glass, low e glass or the like.

This invention will be better understood from the following Examples. However, one skilled in the art will readily appreciate that the specific methods and results discussed are merely illustrative and no limitation is implied. All parts and percentages are by weight unless otherwise specified.

EXAMPLE 1

A polyvinyl butyral composition was prepared by mixing 19 grams of triethyleneglycol bis(2-ethylhexanoate) with 0.32 grams of a 2.2 percent dispersion of lanthanum hexaboride nanoparticles in toluene and then combining this mixture with 50 grams of polyvinyl butyral resin. The resulting composition was blended in a Brabender mixer and pressed to form a 30 mil thick sheet. The sheet was then laminated between two similarly sized sheets of clear glass and pressure was applied to form a laminate. The resulting laminate had a visual transmission of 80 percent and a solar transmission of 62 percent. A similar laminate but containing no lanthanum hexaboride had a visible transmission of 87 percent and a solar transmission of 74 percent. These results show that addition of lanthanum hexaboride substantially reduces solar transmission while maintaining visual transmission at a high level.

EXAMPLE 2

A polyvinyl butyral composition was prepared in a manner similar to Example 1, with the exception that 1.56 grams of a 20 percent dispersion of antimony tin oxide in triethyleneglycol bis(2-ethylhexanoate) was added to the resin along with the lanthanum hexaboride. A sheet was pressed and a laminate made with clear glass having visual transmission of 70 percent and solar transmission of 44 percent.

EXAMPLE 3

A polyvinyl butyral composition was prepared in a manner similar to Example 1, with the exception that 0.462 grams of a 30 percent dispersion of indium tin oxide in triethyleneglycol bis(2-ethylhexanoate) was added to the resin along with the lanthanum hexaboride. A sheet was pressed and a clear glass laminate prepared having visual transmission of 78 percent and solar transmission of 52 percent.

EXAMPLE 4

A polyvinyl butyral sheet was prepared as in Example 3. This sheet was laminated between two sheets of heat absorbing glass (so called green glass). This laminate had visual transmission of 71% and solar transmission of 38%.

EXAMPLE 5

A polyvinyl butyral composition was prepared in a manner similar to Example 1, with the exception that 2 grams of a 20 percent dispersion of a 50:50 mixture of indium tin oxide and antimony tin oxide was added to the resin along with the lanthanum hexaboride. A sheet and laminate were prepared having excellent IR absorbing capacity.

EXAMPLE 6

A polyvinyl butyral composition was prepared by mixing 5.11 grams of 6.3% wt. of LaB6 dispersed in plasticizer triethylene glycol di-(2-ethylhexanoate) with an additional 878.7 grams of triethylene glycol di-(2-ethylhexanoate). This blend of LaB6 and plasticizer was added to 2250 grams of polyvinyl butyral resin and extruded into sheet using a 1.25 inch extruder. The sheet contained 0.01% wt. La B6. The same procedure was used, with appropriate proportions of LaB6 dispersion in plasticizer and additional plasticizer, to make concentrations of 0.015%, 0.02%, 0.025%, and 0.03% wt. LaB6 in polyvinyl butyral sheet. Results of visible and solar transmission of laminates using these sheets between two pieces of 2.3 mm thick clear glass are listed below (solar transmission results were calculated using ISO 9050, air mass 1).

| LaB6 Weight % | Visible Transmittance | Solar Transmittance |
| --- | --- | --- |
| 0 | 89 | 70 |
| 0.01 | 79 | 52 |
| 0.015 | 72 | 44 |

| LaB6 Weight % | Visible Transmittance | Solar Transmittance |
| --- | --- | --- |
| 0.02 | 67 | 38 |
| 0.025 | 62 | 32 |
| 0.03 | 57 | 28 |

EXAMPLE 7

A polyvinyl butyral composition was prepared by mixing 5.11 grams of 6.3% wt. of LaB6 dispersed in plasticizer triethylene glycol di-(2-ethylhexanoate) with 21.47 grams of a 30% wt. dispersion of indium tin oxide in triethylene glycol di-(2-ethylhexanoate) and an additional 863.7 grams of triethylene glycol di-(2-ethylhexanoate). This blend was added to 2250 grams of polyvinyl butyral resin and extruded into sheet using a 1.25 inch extruder. The sheet contained 0.01% wt. LaB6 plus 0.2% indium tin oxide. The average visible and solar transmission of laminates using these sheets between two pieces of 2.3 mm thick clear glass were 77% (visible transmittance) and 44% (solar transmittance; solar transmission results were calculated using ISO 9050, air mass).

Other variations and modifications of this invention will be obvious to those skilled in this art. This invention is not to be limited as except set forth in the following claims.

What is claimed is:

1. A polyvinyl butyral composition comprising melt processable polyvinyl butyral resin containing an infrared absorbing effective amount of
    (i) lanthanum hexaboride present in an amount between about 0.005 and about 0.1 percent by weight of the composition, or
    (ii) a mixture of lanthanum hexaboride present in an amount between about 0.001 and about 0.1 percent by weight of the composition and at least one selected from the group consisting of indium tin oxide and antimony tin oxide, said indium tin oxide and/or antimony tin oxide present in said mixture in an amount of about 0.05 to about 2.0 percent by weight of the composition
    dispersed in said polyvinyl butyral.

2. The polyvinyl butyral composition according to claim 1, comprising a mixture of lanthanum hexaboride and indium tin oxide.

3. The polyvinyl butyral composition according to claim 1, comprising a mixture of lanthanum hexaboride and antimony tin oxide.

4. The polyvinyl butyral composition according to claim 1, comprising a mixture of lanthanum hexaboride, indium tin oxide and antimony tin oxide dispersed in said polyvinyl butyral.

5. A polyvinyl butyral sheet containing an infrared absorbing effective amount of (i) lanthanum hexaboride or (ii) a mixture of lanthanum hexaboride and at least one selected from the group consisting of indium tin oxide and antimony tin oxide dispersed in said polyvinyl butyral sheet, wherein said sheet is extruded.

6. The polyvinyl butyral sheet according to claim 5, comprising a mixture of lanthanum hexaboride and indium tin oxide.

7. The polyvinyl butyral sheet according to claim 5, comprising a mixture of lanthanum hexaboride and antimony tin oxide.

8. The polyvinyl butyral sheet according to claim 5, comprising a mixture of lanthanum hexaboride, indium tin oxide and antimony tin oxide.

9. A glass laminate comprising two sheets of glass with a sheet disposed therebetween comprised of a polyvinyl butyral resin containing an infrared absorbing effective amount of (i) lanthanum hexaboiide or (ii) a mixture of lanthanum hexaboride and at least one selected from the group consisting of indium tin oxide and antimony tin oxide dispersed in said sheet, wherein said sheet is extruded.

10. The glass laminate according to claim 9, wherein said polyvinyl butyral resin comprises lanthanum hexaboride and indium tin oxide.

11. The glass laminate according to claim 9, wherein said polyvinyl butyral resin comprises lanthanum hexaboride and antimony tin oxide.

12. The glass laminate according to claim 9, wherein said polyvinyl butyral resin comprises lanthanum hexaboride, indium tin oxide and antimony tin oxide.

13. The glass laminate according to claim 9, wherein at least one of said two sheets of glass is beat absorbing glass.

14. The glass laminate according to claim 9, wherein at least one of said two sheets of glass is solar reflection glass.

15. The glass laminate according to claim 9, wherein at least one of said two sheets of glass is low e glass.

* * * * *

UNITED STATES PATENT AND TRADEMARK OFFICE
CERTIFICATE OF CORRECTION

PATENT NO. : 6,620,872 B2
DATED : September 16, 2003
INVENTOR(S) : W. Keith Fisher It is certified that error appears in the above-identified patent and that said Letters Patent is hereby corrected as shown below:

<u>Title page,</u>
Item [56], References Cited,
U.S. PATENT DOCUMENTS, Insert

|  |  |  |
|---|---|---|
| -- 5,807,511 | 9/15/98 | Kunimatsu et al. |
| 5,518,810 | 5/21/96 | Nishihara et al. |
| 5,830,568 | 11/3/98 | Kondo |
| 5,137,954 | 8/11/92 | DasGupta et al. |
| 4,281,980 | 8/4/81 | Hoagland et al. |
| 2,904,844 | 9/22/59 | Henry Smithies |
| 2,909,810 | 10/27/59 | Wolfgang Jensch |
| 3,994,654 | 11/30/76 | Chyu |
| 4,575,540 | 3/11/86 | Cartier |
| 3,841,890 | 10/15/74 | Coaker et al. |
| 4,144,217 | 3/13/79 | Snelgrove et al. |
| 5,013,779 | 5/7/91 | Fariss et al. --. |

FOREIGN PATENT DOCUMENTS, Insert
-- FOREIGN PATENT DOCUMENTS

|  |  |  |
|---|---|---|
| 0727306 | 8/1996 | (EP) |
| 1008564 | 6/2000 | (EP) |
| 185863 | 7/1986 | (EP) |
| 2001 8920 | 3/2001 | (JP) --. |

<u>Column 7,</u>
Line 4, "hexaboiide" should read -- hexaboride --.

UNITED STATES PATENT AND TRADEMARK OFFICE
CERTIFICATE OF CORRECTION

PATENT NO. : 6,620,872 B2
DATED : September 16, 2003
INVENTOR(S) : W. Keith Fisher It is certified that error appears in the above-identified patent and that said Letters Patent is hereby corrected as shown below:

Column 8,
Line 5, "beat" should read -- heat --.

Signed and Sealed this

Twenty-ninth Day of June, 2004

JON W. DUDAS
*Acting Director of the United States Patent and Trademark Office*